United States Patent
Schüle (10) Patent No.: US 9,317,346 B2
(45) Date of Patent: Apr. 19, 2016

(54) METHOD AND APPARATUS FOR TRANSMITTING DATA ELEMENTS BETWEEN THREADS OF A PARALLEL COMPUTER SYSTEM

(71) Applicant: SIEMENS AKTIENGESELLSCHAFT, Munich (DE)

(72) Inventor: Tobias Schüle, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 14/783,037

(22) PCT Filed: Feb. 19, 2014

(86) PCT No.: PCT/EP2014/053182
§ 371 (c)(1),
(2) Date: Oct. 7, 2015

(87) PCT Pub. No.: WO2014/166661
PCT Pub. Date: Oct. 16, 2014

(65) Prior Publication Data
US 2016/0041855 A1    Feb. 11, 2016

(30) Foreign Application Priority Data
Apr. 8, 2013   (DE) .......................... 10 2013 206 114

(51) Int. Cl.
*G06F 9/46* (2006.01)
*G06F 9/54* (2006.01)

(52) U.S. Cl.
CPC ...................................... *G06F 9/544* (2013.01)

(58) Field of Classification Search
CPC ... G06F 9/3867; G06F 9/3877; G06F 9/4843; G06F 9/505
USPC ........................... 712/200, 203; 718/100, 105
See application file for complete search history.

(56) References Cited

U.S. PATENT DOCUMENTS

| | | | |
|---|---|---|---|
| 8,307,370 B2* | 11/2012 | Park ....................... | G06F 9/3851 718/104 |
| 8,391,305 B2* | 3/2013 | Basso ................. | H04L 49/9047 370/229 |
| 8,938,598 B2 | 1/2015 | Jones | |
| 2003/0135535 A1 | 7/2003 | Hoeflinger et al. | |

(Continued)

FOREIGN PATENT DOCUMENTS

| | | |
|---|---|---|
| DE | 102012211670 | 1/2013 |
| DE | 10 2013 206 114.5 | 4/2013 |
| WO | PCT/EP2014/053182 | 2/2014 |

OTHER PUBLICATIONS

Hanjun Kim et al., "Scalable Speculative Parallelization on Commodity Clusters," Proceedings of the 43rd Annual IEEE/ACM International Symposium on Microarchitecture, 2010, pp. 3-14.

(Continued)

*Primary Examiner* — Andy Ho
(74) *Attorney, Agent, or Firm* — Staas & Halsey LLP (57) ABSTRACT

Transmitting data elements from source threads to sink threads, which are executed on a plurality of processor cores of a parallel computer system, by using at least one global logical queue, the at least one global logical queue including an associated physical queue for each of the plurality of processor cores and a data element management table that stores, for each source thread executed on a processor core, a count that specifies a total number of data elements that are enqueued by the respective source thread and that are located in one of the physical queues of the at least one global logical queue, and a processor core index that specifies a specific processor core associated with a physical queue that contains the data elements enqueued by the respective source thread.

15 Claims, 4 Drawing Sheets

(56) References Cited

U.S. PATENT DOCUMENTS

2004/0252709 A1   12/2004   Fineberg
2013/0081060 A1   3/2013    Otenko
2013/0081061 A1   3/2013    Dice et al.

OTHER PUBLICATIONS

Charith Wickramarachchi et al., "Andes: a highly scalable persistent messaging system," 2012 IEEE 19th International Conference on Web Services, 2012, pp. 504-511.

Maged M. Michael et al., "Simple, Fast and Practical Non-Blocking and Blocking Concurrent Queue Algorithms," Symposium on Principles of Distributed Computing, 1996, pp. 267-275.

Maurice Herlihy et al., "The Art of Multiprocessor Programming," Morgan Kaufmann, 2008, pp. i-xx, 1-508.

German Office Action for German Priority Patent Application No. 10 2013 206 114.5, issued Feb. 5, 2014, 5 pages.

English language International Search Report for PCT/EP2014/053182, mailed Jun. 4, 2014, 3 pages.

* cited by examiner

METHOD AND APPARATUS FOR TRANSMITTING DATA ELEMENTS BETWEEN THREADS OF A PARALLEL COMPUTER SYSTEM

CROSS REFERENCE TO RELATED APPLICATIONS

This application is based on and hereby claims priority to International Application No. PCT/EP2014/053182 filed on Feb. 19, 2014 and German Application No. 10 2013 206 114.5 filed on Apr. 8, 2013, the contents of both are hereby incorporated by reference.

BACKGROUND

In numerous applications, queues are used for the communication or the exchange of data between components of a system. Queues generally allow components which generate data to be decoupled from components which process or consume data and to operate these components in parallel within the system. Typical fields of application for queues are client-server systems, operating systems, network switching stations, SCADA (Supervisory Control and Data Acquisition) systems, telecommunications systems, image processing applications and systems for entertainment electronics. For example, in so-called SCADA systems, the data or data elements coming from sensors are collected, grouped and subsequently conveyed to the processes responsible for evaluation, monitoring and visualization via queues.

As a rule, known queues have FIFO semantics (First-In, First-Out). This means that the data elements enqueued first are also the first to be dequeued. There are two basic operations available for accessing queues, namely a push operation and a tryPop operation. With the push operation, data elements are enqueued, whereas the tryPop operation dequeues a data element, assuming that the respective queue is not empty.

A thread designates a thread of execution or a sequence of execution in the processing of a program. A thread forms a part of a so-called process. A process is allocated an address space and further operating system means of the respective system. A process can contain a number of threads or also only a single thread. Various threads can share processors or processor cores, a data memory and other operating-system-dependent resources, such as files and network links within a process. The advantage of efficiency in the use of threads consists in that, in contrast to processes, no complete change of the process context is necessary in the case of a change of thread since the threads use a common part of the process context. The sequence of execution and the change between threads are controlled by a scheduler. The scheduler forms an arbitration logic which controls a temporal execution of a number of processes or threads in an operating system.

If a number of threads access a queue, it is necessary to safeguard the consistency of the data. This requires a synchronization mechanism which guarantees that changes at the queue are carried out uninterruptedly. However, this leads to a bottleneck in the case of parallel computer systems which contain a number of processors or processor cores, respectively, since the accesses are ultimately sequential. This has the consequence that the scalability of the applications is greatly restricted.

Furthermore, the memory accesses accompanying push or tryPop operations can lead to a bottleneck, especially in a non-uniform memory access (NUMA) system. Such systems have a common address space but have physically separate memories. Since, as a rule, accesses to remote memory areas take much longer than accesses to a local memory, a high data locality is decisive for a high performance of the system especially in the case of NUMA systems.

There are numerous approaches for the implementation of queues as described, for example, in M. Herlihy and N. Shavit "The Art of Multiprocessor Programming", Morgan Kaufmann, 2008. To ensure the consistency of the data, the queue is blocked globally with each access, in the simplest case, for example by means of a so-called mutex (Mutual Exclusion). This ensures that at any time only one thread can ever enqueue or dequeue a data element. A disadvantage of this known approach (exclusive approach) is the lack of scalability since all accesses are sequentiallized.

A further known approach, called blocking approach, uses separate blocks for enqueuing and dequeuing data elements. This means that at the same time one data element can be enqueued and another data element dequeued. However, it is not possible that a number of source threads in each case enqueue a data element or a number of sink threads in each case dequeue a data element at the same time. For this reason, the scalability is greatly restricted also with this known approach.

Other known approaches attempt to manage without such blocks in order to minimize the synchronization effort. These approaches operate exclusively with so-called atomic operations, i.e. uninterruptible operations and thus belong to the class of non-blocking algorithms. In the method specified in M. M. Michael and M. L. Scott "Simple, fast and practical non-blocking and blocking concurrent queue algorithms", Symposium on Principles of Distributed Computing, pages 267 to 275, 1996 (non-blocking approach), the data elements are managed in the form of a list, the list operations being performed atomically. In this way, a number of source and sink threads can access a queue virtually simultaneously. However, this known approach with the aid of atomic operations instead of blocks can also lead to a bottleneck due to the cache coherence, particularly if the threads involved access memory areas which are close to one another.

Various known variants and refinements of the fundamental approaches described above have in common that all of them operate on a global data structure, for example use a list or a field. This inevitably leads to a bottleneck since the securing of the data consistency always requires a minimum amount of synchronization. In addition, the problem, addressed above, of accesses to remote memory areas occurs particularly in NUMA systems.

SUMMARY

The various embodiments described below relate to a method and an apparatus for transmitting data elements from source threads to sink threads within a parallel computer system which includes a number of processors which in each case contain at least one processor core.

It is an object of the embodiments described herein, therefore, to create a method and a device for transmitting data elements between threads in which bottlenecks are avoided and which offer high performance.

The various embodiments described herein include a method for transmitting data elements from source threads to sink threads which are executed on processor cores of a parallel computer system, by means of at least one global logical queue which has for each processor core of the parallel computer system an associated physical queue and which includes a data element management table which stores for each source thread executed on a processor core a count (Count) which specifies the total number of data elements enqueued by the respective source thread, and located, in one of the physical queues of the logical queue, and a processor core index (CORE) which specifies the processor core in the physical queue of which the data elements enqueued there by the respective source thread are located.

In the method described herein, a number of local data structures not visible from the outside are used instead of a global data structure. This eliminates a bottleneck and the source/sink threads can simultaneously enqueue or dequeue data elements.

In one possible embodiment of the method described herein, a thread index of the source thread is determined by a source thread executed on a processor core on enqueuing a data element in the logical queue and enqueued together with the data element coming from the source thread in the physical queue of the processor core on which the source thread is executed if the count (Count), stored in the data element management table of the logical queue, of the executed source thread is zero and specifies that there is no data element coming from the source thread located in one of the other physical queues of the logical queue as yet.

In one possible embodiment of the method described herein, if the count (Count), stored in the data element management table of the logical queue, of the source thread is not zero and specifies that data elements coming from the source thread are already located in one of the physical queues of the logical queue, the found thread index of the source thread, together with the data element coming from the source thread, is enqueued in the physical queue in which the data elements coming from the source thread are already located.

In a further possible embodiment of the method described herein, on a data element being dequeued from the logical queue by a sink thread executed on a processor core, this sink thread initially accesses the physical queue which is allocated to the processor core of the parallel computer system on which the sink thread is executed and subsequently reads a data element out of this physical queue if a data element is located there.

In a further possible embodiment of the method described herein, on a data element being dequeued from the logical queue by a sink thread, this sink thread accesses other randomly selected physical queues of other processor cores of the parallel computer system if there is no data element located in the physical queue which is allocated to the processor core on which the sink thread is executed.

In another possible embodiment of the method described herein, the logical queue returns an error message (false) to the sink thread if there is no data element located in the physical queues of the other processor cores either.

In another possible embodiment of the method described herein, the physical queues or the logical queue are in each case formed by a FIFO queue which includes a number of memory elements sequentially linked to one another.

In another possible embodiment of the method described herein, a memory element of a physical queue stores a data element and its associated thread index, this thread index specifying the source thread from which the data element comes.

In another possible embodiment of the method described herein, the physical queues of all processor cores of a processor (P) are provided in a memory (M) belonging to the processor.

In another possible embodiment of the method described herein, the number of the threads executed on processor cores of the parallel computer system are monitored and the method for transmitting data elements from source threads to sink threads is executed when the monitored number of threads within the parallel computer system exceeds an adjustable threshold value.

The various embodiments described herein further include a computer system having a number of processors which have in each case a number of processor cores, wherein for each processor a memory is provided in which, for each processor core of the respective processor, an associated physical queue is stored which includes a number of sequentially linked memory elements, wherein each memory element in each case stores a data element transmitted between two threads executed on processor cores and an associated thread index which specifies a source thread from which the transmitted data element comes, wherein the physical queues of all processor cores together form a global logical queue of the parallel computer system which has a data element management table in which, for each source thread executed on a processor core, a count (Count) is stored which specifies the total number of data elements enqueued by the respective source thread, and located, in one of the physical queues of the logical queue, and a processor core index (CORE) which specifies the processor core in the physical queue of which the data elements enqueued there by the respective source thread are located.

In a possible embodiment of the computer system described herein, the processors and their memories are connected to one another via an interconnection network of the computer system via which data elements are transmitted between the processors by means of the global logical queue.

In a further possible embodiment of the computer system described herein, each processor core of a processor has a level-1 cache memory which is coupled to a level-2 cache memory of the processor.

In a further possible embodiment of the computer system described herein, the level-2 cache memory of the processor is connected to the interconnection network of the parallel computer system.

In a possible embodiment of the computer system described herein, the computer system is a NUMA (Non-Uniform Memory Access) system.

BRIEF DESCRIPTION OF THE DRAWINGS

These and other objects and advantages will become more apparent and more readily appreciated from the following description of the various embodiments, taken in conjunction with the accompanying drawings of which.

DETAILED DESCRIPTION OF THE EMBODIMENTS

Reference will now be made in detail to the various embodiments, examples of which are illustrated in the accompanying drawings, wherein like reference numerals refer to like elements throughout.

Figure 1:
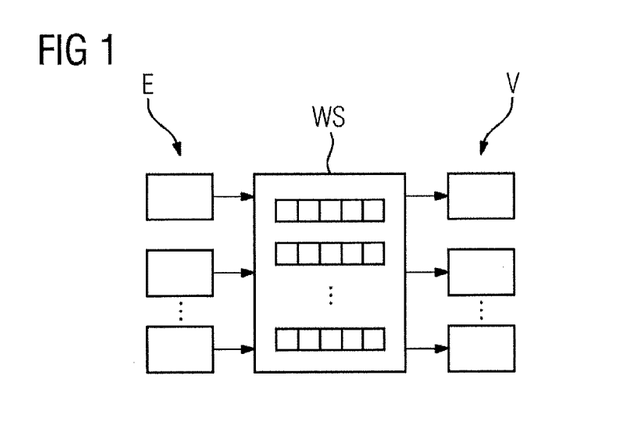
FIG. 1 shows a diagrammatic drawing for explaining the fundamental operation of the method for transmitting data elements.

Data elements are transmitted from source threads E to sink threads V within a parallel computer system, using a global logical queue WS. The diagrammatic drawing shown in FIG. 1 illustrates a concept forming the basis of the method and device described herein, which consists in using, instead of a global data structure, a number of local data structures not visible from the outside, or physical queues, respectively. The physical or physically implemented queues together form the logical queue WS of the parallel computer system. The logical queue WS can be implemented on one or more main memories M. The logical queue WS receives data elements from source threads E and transmits them to sink threads V. The source threads E and sink threads V are executed on processor cores $C_i$ of the parallel computer system. Using the logical queue WS eliminates a bottleneck of the parallel computer system since the source threads E and sink threads V can enqueue or dequeue data elements simultaneously in the logical queue WS. The logical queue WS implemented in this way retains its FIFO semantics in this case. This means that the sequence of data elements which are enqueued by one source thread E and dequeued by another thread is retained. For this purpose, the logical queue WS keeps a record of which thread has enqueued data in which local physical queue Q. This can be done with the aid of a data element management table in the case of one possible implementation.

Figure 2:
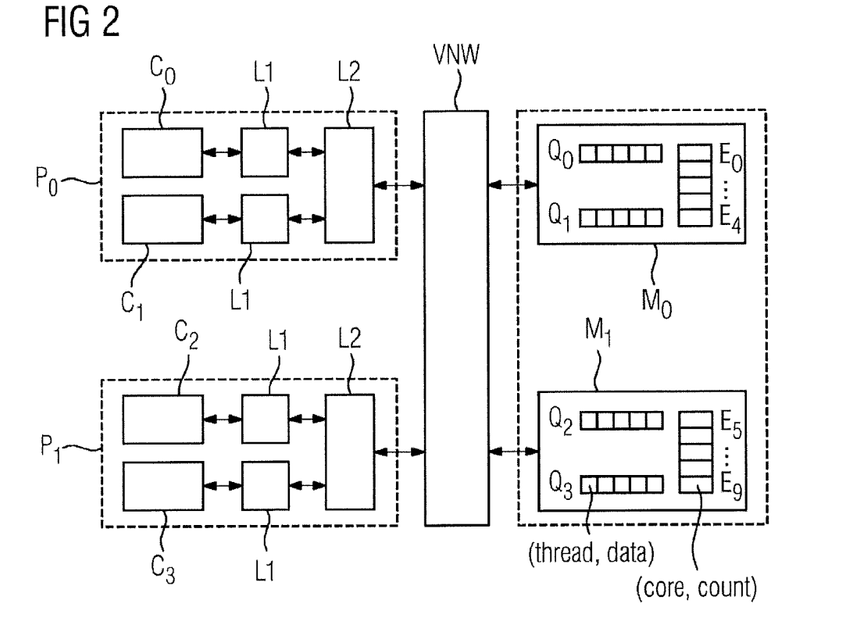
FIG. 2 shows a block diagram for representing an embodiment of a parallel computer system, in which the method for transmitting data elements can be applied.

FIG. 2 shows a block diagram for representing a parallel computer system on which the method for transmitting data elements from source threads E to sink threads V can be executed. The parallel computer system shown in FIG. 2 can be, for example, a NUMA (Non-Uniform Memory Access) system. Such a NUMA system has a common address space but physically separate memories M as indicated in FIG. 2. The parallel computer system has a number of processors P which in each case contain a number of processor cores C. In the example shown in FIG. 2, the parallel computer system has two processors P0, P1 which in each can contain two processor cores. The first two processor cores C0, C1 are located in a first processor P0, while the other processor cores C2, C3 are in another processor P1. In the embodiment shown in FIG. 2, the computer system also has two memory units M0, M1. In this context, the first memory unit M0 is allocated to the first processor P0, and the second memory unit M1 to the second processor P1. The processor P0 has the two first processor cores C0, C1 and the second processor P1 has the processor cores C2, C3. Thus, for each processor P of the computer system, a memory or a memory unit M is provided in which an associated physical local queue Q is stored for each processor core C of the respective processor P. In the simple parallel computer system shown in FIG. 2, a first physical queue Q0 is stored in the memory M0 of the first processor P0 for the first processor core C0 of the first processor P0, and a second physical queue Q1 is stored for the second processor core C1 of the first processor P0. In the same way, the second memory M1 has in each case an associated physical local queue Q2, Q3, as shown in FIG. 2, for the second processor P1 for each of the two processor cores C2, C3 contained therein. The physical queues $Q_i$ in each case include sequentially linked addressable memory elements. In one possible embodiment, the memory elements are interconnected sequentially. In an embodiment, the memory elements are logically concatenated sequentially, for example with the aid of pointers or the like. Each memory element of a physical queue Q in each case stores a data element which is transmitted between two threads which can be executed on different processor cores, and an associated thread index. This thread index specifies a source thread E from which the transmitted data element comes. The physical queues Q of all processor cores C of the parallel computer system together form a global logical queue WS of the parallel computer system. In the embodiment, shown in FIG. 2, of a parallel computer system, the physical queues Q0, Q1, Q2, Q3 form the global logical queue WS of the entire parallel computer system. This logical queue WS has a data element management table as indicated in FIG. 2. In this data element management table, a count (Count) is stored for each source thread E, executed on a processor core C, which count specifies the total number of data elements enqueued by the respective source thread, and located, in one of the physical queues Q of the one logical queue WS. In addition, a processor core index (Core) is stored in the data element management table for each source thread E executed on a processor core C, which processor core index specifies the processor core C in the physical local queue Q of which the data elements enqueued there by the respective source thread E are located.

In the embodiment shown in FIG. 2, the data element management table has ten entries (E0 to E9) for ten different threads of the parallel computer system. As shown in FIG. 2, the data element management table can be implemented on different memories of the parallel computer system, i.e. on memories M0 and M1, or stored distributed over different memory units M. The number of entries or management threads can change dynamically.

As shown in FIG. 2, processors P and their memories M are connected to one another via an interconnection network VNW of the computer system. Via the interconnection network VNW, data elements are transmitted between the processors P by means of the global logical queue WS. The interconnection network VNW can be, for example, a bus, a data ring or also crossbar distributors or the like. The various processors P are connected to the interconnection network VNW and in each case include a number of processor cores C. As shown in FIG. 2, the processors P can contain, for example, two processor cores C in each case. Each processor core C of a processor P has in this case, as shown in FIG. 2, a level-1 cache memory L1 which is coupled to a level-2 cache memory L2 of the processor P. The level-2 cache memory L2 of the processor is in turn connected to the interconnection network VNW of the parallel computer system. The computer system shown in FIG. 2 can be, for example, a NUMA system. In the embodiment shown in FIG. 2, the NUMA system has two processors P which contain in each case two processor cores C0, C1 and C2, C3, respectively. All processor cores C have their own level-1 cache memory L1 and are coupled via their level-2 cache memory L2. The memory linkage to the memory units M0, M1 is effected via the interconnection network VNW. For each processor core $C_i$, precisely one physical queue $Q_j$ allocated to it is provided which is located in a memory M of the corresponding processor P. To achieve high data locality, the memory area for a queue $Q_j$ is linked to the physical memory in the allocation. Apart from the actual data of the data element, the associated thread index is additionally stored which specifies the source thread E which has enqueued the data element. A stored element thus includes a data pair, namely the thread index and the useful data of the data element (thread, data). The data element management table of the logical queue WS stores for each thread $E_i$ how many of the data elements enqueued by it are still located in the parallel computer system and in which queue (processor core index CORE) these data elements are located. This information is used for securing the FIFO semantics. A table entry in the data management table thus also includes a pair, namely a count (Count), and a processor core index (Core). The count (Count) of the pair specifies the total number of data elements enqueued by the respective source thread E, and located, in one of the physical queues of the logical queue WS. The processor core index (Core) specifies the processor core C in the physical queue Q of which data elements enqueued there by the respective source thread E are located.

As can be seen from FIG. 2, each processor core C has its own physical local queue Q which is firmly linked to the memory M of the respective processor P. Each data element contains, apart from the useful data, the index of the thread which has enqueued the data element. For each source thread E, there is one entry in the data management table of the logical queue WS which shows how many data elements of this source thread E are still located in the system and in which local queue Q they are located.

The logical queue WS of the parallel computer system allows various operations, particularly the inserting of a data element (push) and the dequeuing of a data element (tryPop). Enqueuing a data element (push) is shown as a flowchart in FIG. 3. During the enqueuing of a data element in the logical queue WS of the parallel computer system, the index of the calling thread is firstly determined (get index of current thread). If there are no data of the calling thread in one of the queues (E[i].count=0), the data element is enqueued in the queue Q of the processor core C which executes the thread. In this case, no access to a remote memory area is thus required. Otherwise, the data element is enqueued in the queue Q in which there are already data elements of the calling thread. If the thread has not been displaced to another processor core C in the meantime, this is also the local queue.

Figure 3:
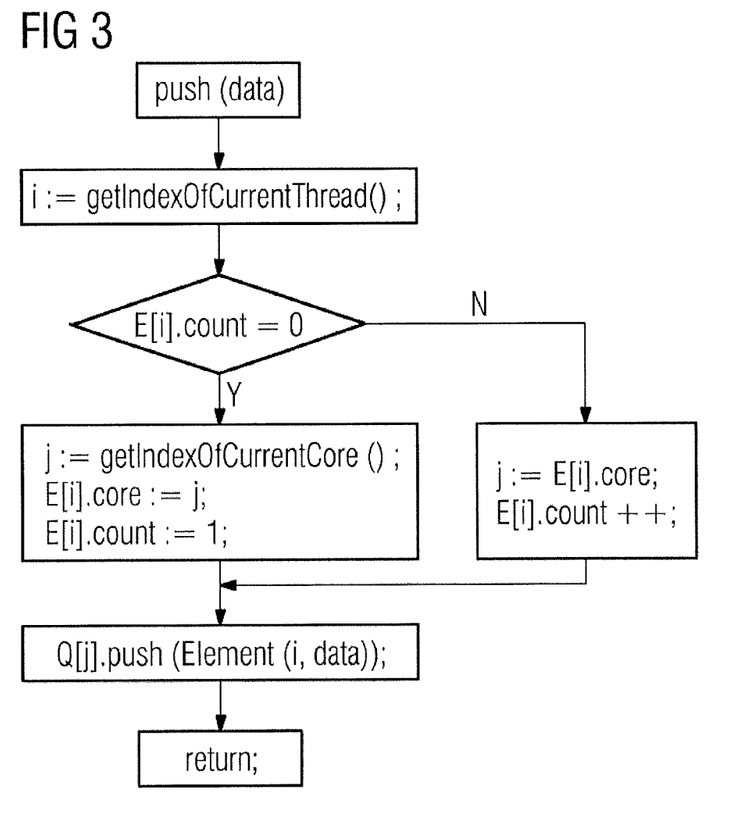
FIG. 3 shows a flowchart for explaining the enqueuing of a data element in a queue.

As can be seen from FIG. 3, a thread index of the source thread E is initially determined by a source thread executed on a processor core C on enqueuing (push) a data element in the logical queue and enqueued together with the data element coming from the source thread in the physical queue Q of the processor core C on which the source thread is executed if the count (Count), stored in the data element management table of the logical queue, of the executed source thread is zero and specifies that there is no data element coming from the source thread located in a physical queue Q of the logical queue WS as yet. If conversely the count (Count), stored in the data element management table of the logical queue WS, of the source thread E is not zero and specifies that data elements coming from the source thread E are already located in one of the physical queues Q of the logical queue WS, the thread index of the source thread, together with the data element coming from the source thread, is enqueued in the physical queue Q in which the data elements coming from the source thread E are already located.

Figure 4:
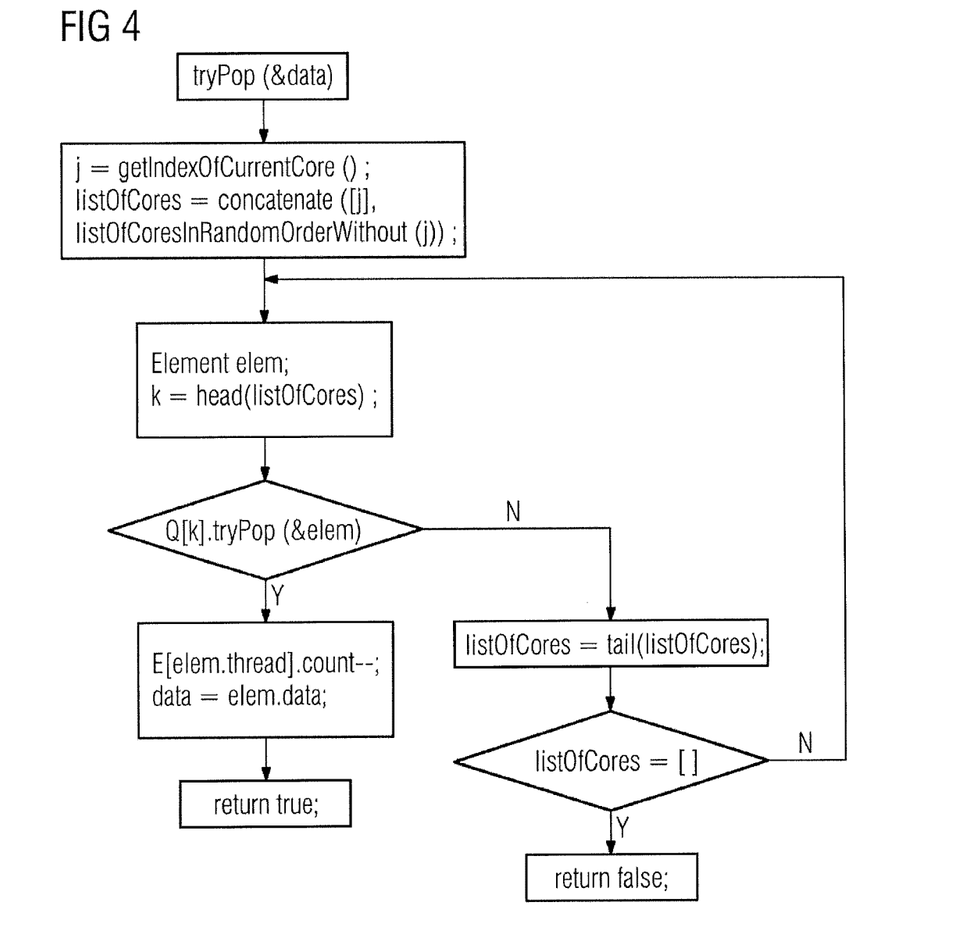
FIG. 4 shows a flowchart for representing the dequeuing of a data element from a queue.

The logical queue WS used in the computer system also allows data elements to be dequeued from it. The sequence on dequeuing a data element from the logical queue is shown in the flowchart shown in FIG. 4. On a data element being dequeued (tryPop) from the logical queue WS by a sink thread V executed on the processor core C, this sink thread V initially accesses the physical queue Q which is allocated to the processor core C of the parallel computer system on which the sink thread V is executed and subsequently reads a data element out of this physical queue Q if a data element is located there. On a data element being dequeued from the logical queue WS by a sink thread V, this sink thread accesses other randomly selected physical queues Q of other processor cores C of the parallel computer system if there is no data element located in the physical queue Q which is allocated to the processor core C on which the sink thread V is executed. As shown in FIG. 4, the logical queue returns an error message (false) to the sink thread V if there is no associated data element located in the physical queues Q of the other processor cores C either. As can be seen from FIG. 4, the dequeuing sink thread firstly attempts to dequeue a data element from the queue Q of the processor core C which executes the sink thread V. If the queue Q is not empty, no accesses to remote memory areas are produced here either (return value=true). Otherwise, the sink thread V attempts to dequeue a data element from another, randomly selected queue Q. This process is repeated until a data element has been found or all logical physical queues Q within the logical queue WS have been polled. In the latter case, the error message (false) is then returned.

The push operation shown in FIG. 3 ensures that the data elements, located in the system, of a thread are located in one and the same queue Q, preferably in the local queue.

The tryPop operation shown in FIG. 4 preferably dequeues data elements from the local queue Q. It is only when the latter is empty, that other queues are accessed.

The data elements which can be transmitted between source and sink threads in the computer system described herein can be arbitrary data elements, for example individual bits, bytes, data words, frames but also more complex data structures such as, for example, vectors, images or the like. The data elements can also include user-defined data structures.

Figure 5:
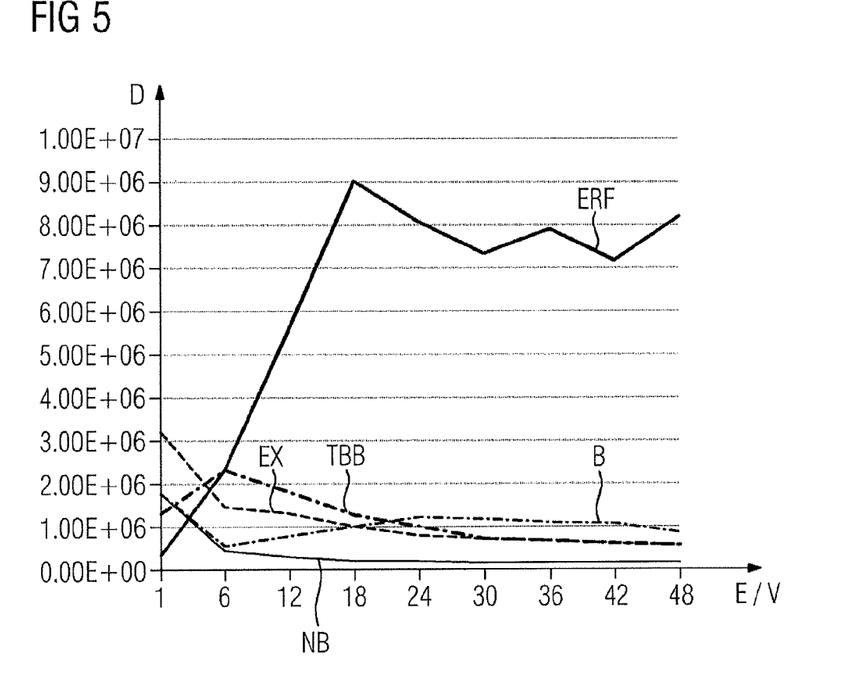
FIG. 5 shows a diagram for representing the achievable throughput in comparison with methods which use known queues.

FIG. 5 shows a diagram for representing the throughput or the performance, respectively, of a computer system described herein which contains a logical queue WS, and of known computer systems. The throughput specifies the number of data elements transmitted per time. The y axis shows the throughput in data elements per second with respect to the number of threads which include source threads E and sink threads V. In the diagram shown, the number of threads E/V is between 1 and 48. As can be seen from FIG. 5, the throughput D or the performance, respectively, initially increases greatly in a parallel computer system which uses a logical queue WS which is used for transmitting data elements in the method described herein, the performance or the throughput D, respectively, exceeding the throughput of known systems already from a number of six threads onward. With a number of 18 threads, the throughput or performance of the computer system described herein exceeds the performance of known systems by about a factor of 9. With a very low number of threads, the performance or throughput D, respectively, is less than in other systems or methods. In known control installations or in the case of servers which stream video data, the number of threads is usually much higher, for example 20 to 30 threads within the parallel computer system. In the case of such installations in which a multiplicity of threads are executed at the same time, the method and system described herein is thus clearly superior to known systems as can be seen from FIG. 5.

In one possible embodiment of the method described herein, the number of threads executed on the processor core C of the parallel computer system is monitored and the procedure is changed to the method for transmitting data elements from source threads E to sink threads V when the monitored number of threads exceeds an adjustable threshold value. For example, the threshold value can be set to ten threads per computer system. The operations, shown in FIGS. 3, 4, of access to the logical queue WS can be stored as a routine in a library in one possible embodiment.

One advantage of the method described herein is that it leads to a higher scalability since accesses to the individual queues are predominantly local. Thus, a number of source and sink threads can simultaneously produce or consume data elements without mutually interfering with each other. This leads to an increase in the throughput D as shown in FIG. 5. FIG. 5 shows the throughput of various queues as a function of the number of threads. The methods designated as exclusive (EX), blocking (B) and non-blocking (NB) are also shown for comparison. In contrast, TBB (Threading Building Blocks) is a C++ library by Intel which contains optimized non-blocking implementations of queues. The curve ERF shows the throughput D of the method described herein. As can be seen from FIG. 5, the method according described herein delivers a much higher throughput D than known methods, from a number of about six source and sink threads onward which run on different processor cores C.

The method for transmitting data elements from source threads E to sink threads V can be used with the aid of a scheduling mechanism in a multiprocessor system. The logical queue WS used in the method described herein can be used for various applications in order to decouple threads E generating data from threads V consuming data and to operate these in parallel. For example, the logical queue WS is suitable for a client-server system, an operating system, a network switching station, an SCADA system, a telecommunications system, an image processing system and for systems of entertainment electronics.

The various embodiments have been described in detail with particular reference and examples, but it will be understood that variations and modifications can be effected within the spirit and scope of the various embodiments covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

The invention claimed is:

1. A method comprising:
   transmitting data elements from source threads to sink threads, the source threads and the sink threads being executed on a plurality of processor cores of a parallel computer system, by using at least one global logical queue, the at least one global logical queue including an associated physical queue for each of the plurality of processor cores and storing, in a data element management table,
   a count specifying a total number of data elements enqueued by each source thread executed on a processor core and that are located in one of the physical queues of the at least one global logical queue, and
   a processor core index specifying a specific processor core associated with a physical queue containing the data elements enqueued by a respective source thread.

2. The method as claimed in claim 1, wherein when the count of an executed source thread is zero, a data element included in the executed source thread and a thread index of the data element are enqueued in the physical queue of an associated processor core on which the source thread has been executed.

3. The method as claimed in claim 1, wherein, when the count of an executed source thread is not zero, a data element included in the executed source thread is enqueued in a physical queue in which other data elements coming from the source thread are already located.

4. The method as claimed in claim 1, wherein when a data element is dequeued from the global logical queue by a sink thread executed on one of the processor cores, the sink thread initially accesses the physical queue associated with the one of the processor cores and subsequently reads a data element out of the physical queue when the data element is located in the physical queue.

5. The method as claimed in claim 4, wherein the sink thread accesses other randomly selected physical queues of other processor cores when there is no data element located in the physical queue associated with the one or the processor cores.

6. The method as claimed in claim 5, wherein the global logical queue returns an error message to the sink thread when there is no data element located in any of the randomly selected physical queues of the other processor cores.

7. The method as claimed in claim 1, wherein the physical queues included in the global logical queue are each formed by a First-In, First-Out queue that includes a plurality of memory elements sequentially linked to one another.

8. The method as claimed in claim 7, wherein each memory element of each physical queue stores a respective data element and a thread index associated with the respective data element, the thread index specifying a source thread that includes the respective data element.

9. The method as claimed in claim 1, wherein the physical queues associated with processor cores included in a processor are located in a memory of the processor.

10. The method as claimed in claim 1,
    further comprising monitoring a number of threads executed on the plurality of processor cores, and
    wherein said transmitting of the data elements from the source threads to the sink threads using the at least one global logical queue is executed when the number of threads executed on the plurality of processor cores exceeds an adjustable threshold value.

11. A computer system comprising:
    a plurality of processors, each processor including a plurality of processor cores;
    a plurality of memories, each memory being associated with a respective processor, each memory including a physical queue that is associated with a processor core of the respective processor and that includes a plurality of sequentially linked memory elements, each memory element storing a data element transmitted between two threads executed on the processor cores and an associated thread index that specifies a source thread including the respective data element, the physical queues together forming a global logical queue of the parallel computer system, the global logical queue including a data element management table storing a count specifying a total number of data elements enqueued by each source thread executed on a processor core and that are located in one of the physical queues of the at least one global logical queue, and a processor core index specifying a specific processor core associated with a physical queue containing the data elements enqueued by a respective source thread.

12. The computer system as claimed in claim 11, further comprising an interconnection network connecting the plurality of processors and the plurality of memories, the interconnection network being configured to transmit data elements between the processors via the global logical queue.

13. The computer system as claimed in claim 12, wherein each processor core includes a level-1 cache memory coupled to a level-2 cache memory of the respective processor.

14. The computer system as claimed in claim 13, wherein each level-2 cache memory is connected to the interconnection network.

15. The computer system as claimed in claim 11, wherein the computer system is a Non-Uniform Memory Access system.

* * * * *